(12) United States Patent
Tanner, Jr. et al.

(10) Patent No.: US 7,493,490 B2
(45) Date of Patent: Feb. 17, 2009

(54) CENTRALIZED DETECTOR OF DYNAMIC, ROBUST, EMBEDDED-SIGNALS

(75) Inventors: Theodore C. Tanner, Jr., Hollywood, SC (US); Steven E. Swenson, Redmond, WA (US); Martin G. Puryear, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 621 days.

(21) Appl. No.: 10/676,247

(22) Filed: Sep. 30, 2003

(65) Prior Publication Data

US 2005/0071604 A1    Mar. 31, 2005

(51) Int. Cl.
*H04L 9/00*    (2006.01)

(52) U.S. Cl. ..................................... 713/176

(58) Field of Classification Search ............... 713/176; 382/232, 240
See application file for complete search history.

(56) References Cited

U.S. PATENT DOCUMENTS

| 6,442,285 B2* | 8/2002 | Rhoads et al. ............ 382/100 |
| 2003/0063570 A1* | 4/2003 | Katayama et al. ........... 370/252 |

* cited by examiner

*Primary Examiner*—Gilberto Barron, Jr.
*Assistant Examiner*—Devin Almeida
(74) *Attorney, Agent, or Firm*—Lee & Hayes, PLLC

(57) ABSTRACT

Described herein is a technology for dynamic and robust detection of one or more embedded-signals (e.g., watermark, copyright notice, encoded data, etc.) in an input signal (e.g., multimedia stream, video stream, audio stream, data, radio, etc.) within a multi-signal environment. This abstract itself is not intended to limit the scope of this patent. The scope of the present invention is pointed out in the appending claims.

35 Claims, 5 Drawing Sheets

CENTRALIZED DETECTOR OF DYNAMIC, ROBUST, EMBEDDED-SIGNALS

TECHNICAL FIELD

This invention generally relates to a technology for detection of one or more embedded-signals.

BACKGROUND

As used herein, "intangible goods" is a generic label for electronically stored or transmitted content. Examples of intangible goods include images, audio clips, video, multimedia, software, metadata, and data. An intangible good may be analog or digital. Depending upon the context, an intangible goods may also be called a "digital signal," "content signal," "digital bitstream," "media signal," "digital object," "object," and the like.

Intangible goods are often distributed to consumers over private and public networks—such as Intranets and the Internet. In addition, these goods are distributed to consumers via fixed computer-readable media, such as a compact disc (CD-ROM), digital versatile disc (DVD), soft magnetic diskette, hard magnetic disk (e.g., a preloaded hard drive), portable media players, and flash memory cards. Furthermore, goods are distributed via communications streams such as those originating from a client such as an instant messenger or another audio/visual chat application.

Unfortunately, it is relatively easy for a person to pirate the content of intangible goods at the expense and harm of the content owners—which include the content author, publisher, developer, distributor, etc. The content-based industries (e.g., entertainment, software, audio and/or video, film, etc.) that produce and distribute content are plagued by lost revenues due to piracy.

Embedded-Signals

Embedding one or more signals in a carrier signal (e.g., intangible goods) is one of the most promising techniques for protecting the content owner's rights of intangible goods. This embedded-signal is commonly called a "watermark" and the embedding process is commonly called "watermarking."

Generally, watermarking is a process of altering the intangible good such that its perceptual characteristics are preserved. For example, a "watermark" is a pattern of bits or signal stream inserted into a digital or analog good that may be used for many purposes, such as identifying the content owners and/or the protected rights.

A watermark embedder (i.e., encoder) is used to embed a watermark into intangible goods. A watermark detector is used to detect the existence of the watermark in the watermarked intangible goods and possibly identifying that watermark.

Watermark detection is often performed in real-time even on small electronic components. Such a "real-time" detector is also often called a "dynamic detector." Generally, this means that the detector is attempting to detect a watermark in intangible goods as the goods are being consumed (e.g., played, presented, stored, and such). For example, if the intangible good is an audio signal, the detector attempts detection while the audio signal is being played.

Such dynamic watermark detection is often a very expensive operation (in terms of computing resources). If there are multiple input streams, then conventionally there are multiple dynamic watermark detection modules running (i.e. one per input stream). The expense in computing resources increases with each watermark detection module invoked to operate on an input stream.

Those of ordinary skill in the art are familiar with conventional techniques and technology associated with watermarks, watermark embedding, and watermark detecting.

SUMMARY

Described herein is a technology for dynamic and robust detection of one or more embedded-signals (e.g., watermark, copyright notice, encoded data, etc.) in an input signal (e.g., multimedia stream, video stream, audio stream, data, radio, etc.) within a multi-signal environment.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, thereby better-explaining the present invention. Furthermore, for ease of understanding, certain method steps are delineated as separate steps; however, these separately delineated steps should not be construed as necessarily order dependent in their performance.

The following description sets forth one or more exemplary implementations of a Centralized Detector of Dynamic, Robust, Embedded-Signals that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Centralized Detector of Dynamic, Robust, Embedded-Signals may be referred to as an "exemplary central watermark detector" or "exemplary CWD."

Incorporation by Reference

The following co-pending patent application is incorporated by reference herein: U.S. patent application Ser. No. 10/676,499, entitled "Circumvention of Dynamic, Robust, Embedded-Signal Detection" filed on Sep. 30, 2003, and assigned to the Microsoft Corporation.

Introduction

Figure 5:
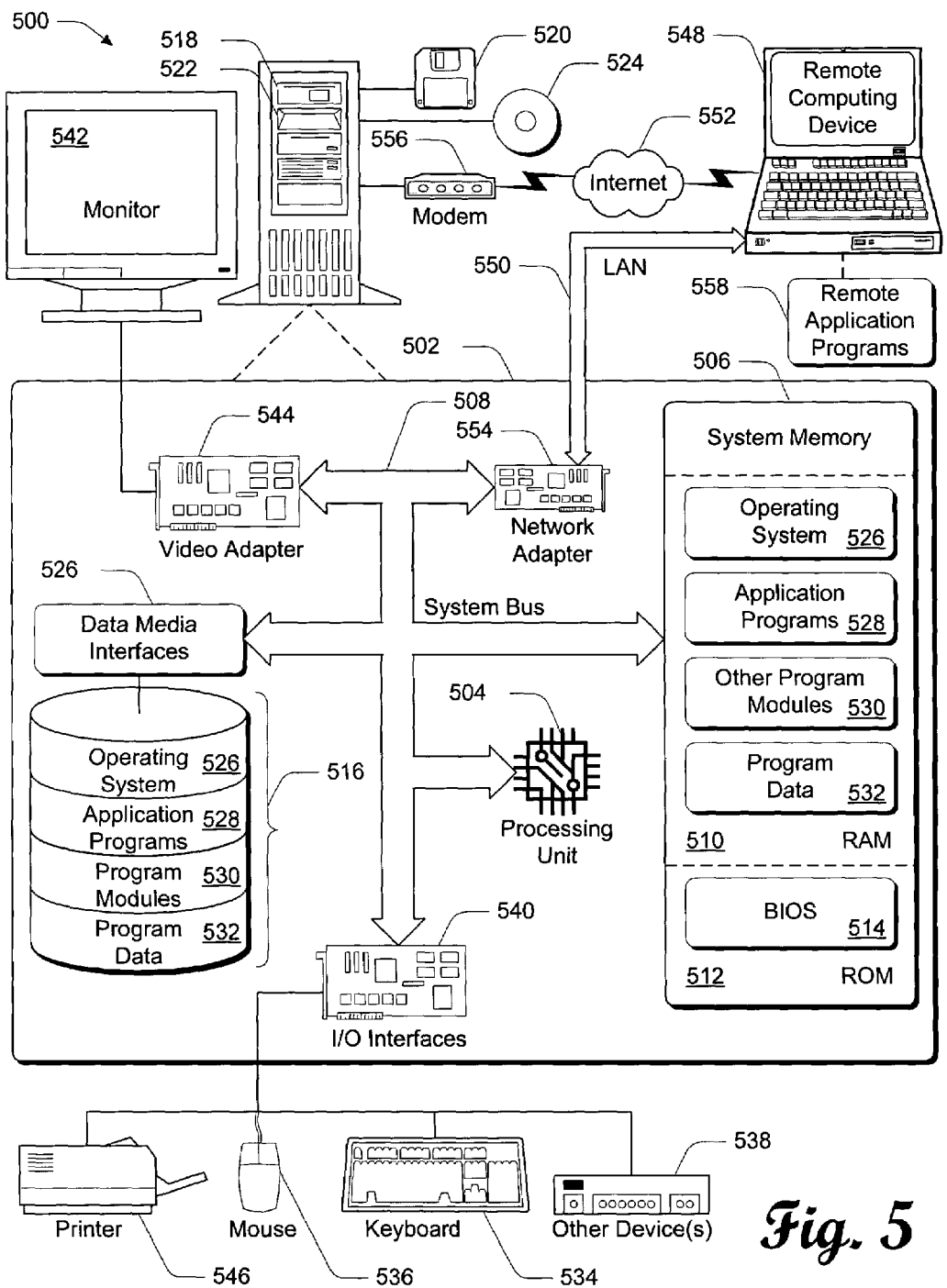
FIG. 5 is an example of a computing operating environment capable of (wholly or partially) implementing at least one embodiment described herein.

The one or more exemplary implementations, described herein, of the present claimed invention may be implemented (in whole or in part) by a central watermark detector 252 as part of a computing device 226 (of FIG. 2) and/or as part of a computing environment like that shown in FIG. 5.

Figure 2:
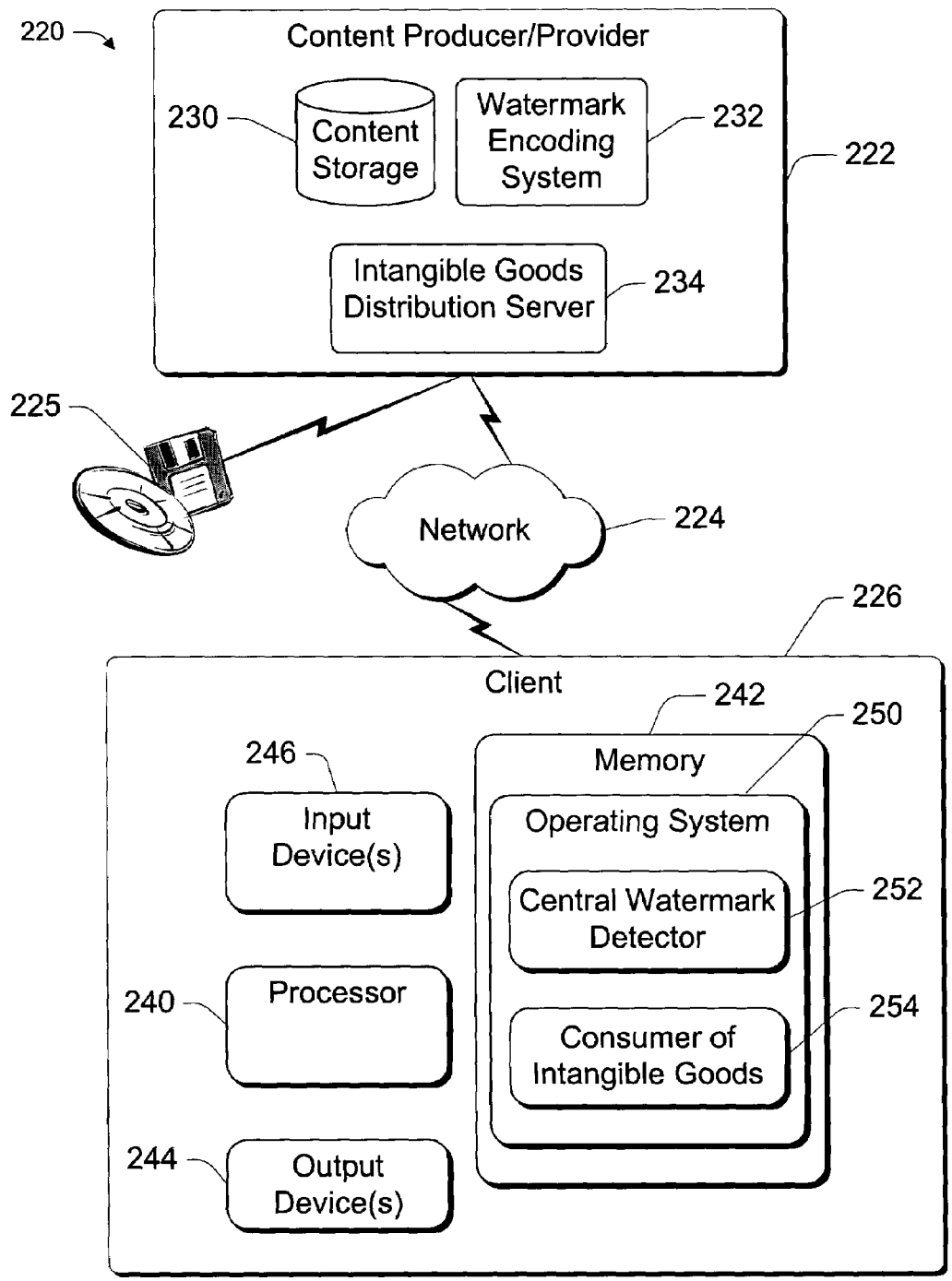
FIG. 2 is a block diagram showing a production and distribution system in which a content producer/provider watermarks intangible goods and subsequently distributes that watermarked intangible goods to a client. It also shows the computer client capable of (wholly or partially) implementing at least one embodiment described herein.

The central watermark detector 252 may be implemented with software, hardware, or a combination thereof. More specifically, this detector may be part of an operating system 250 (as shown in FIG. 2).

Multi-Signal Environment

Figure 1:
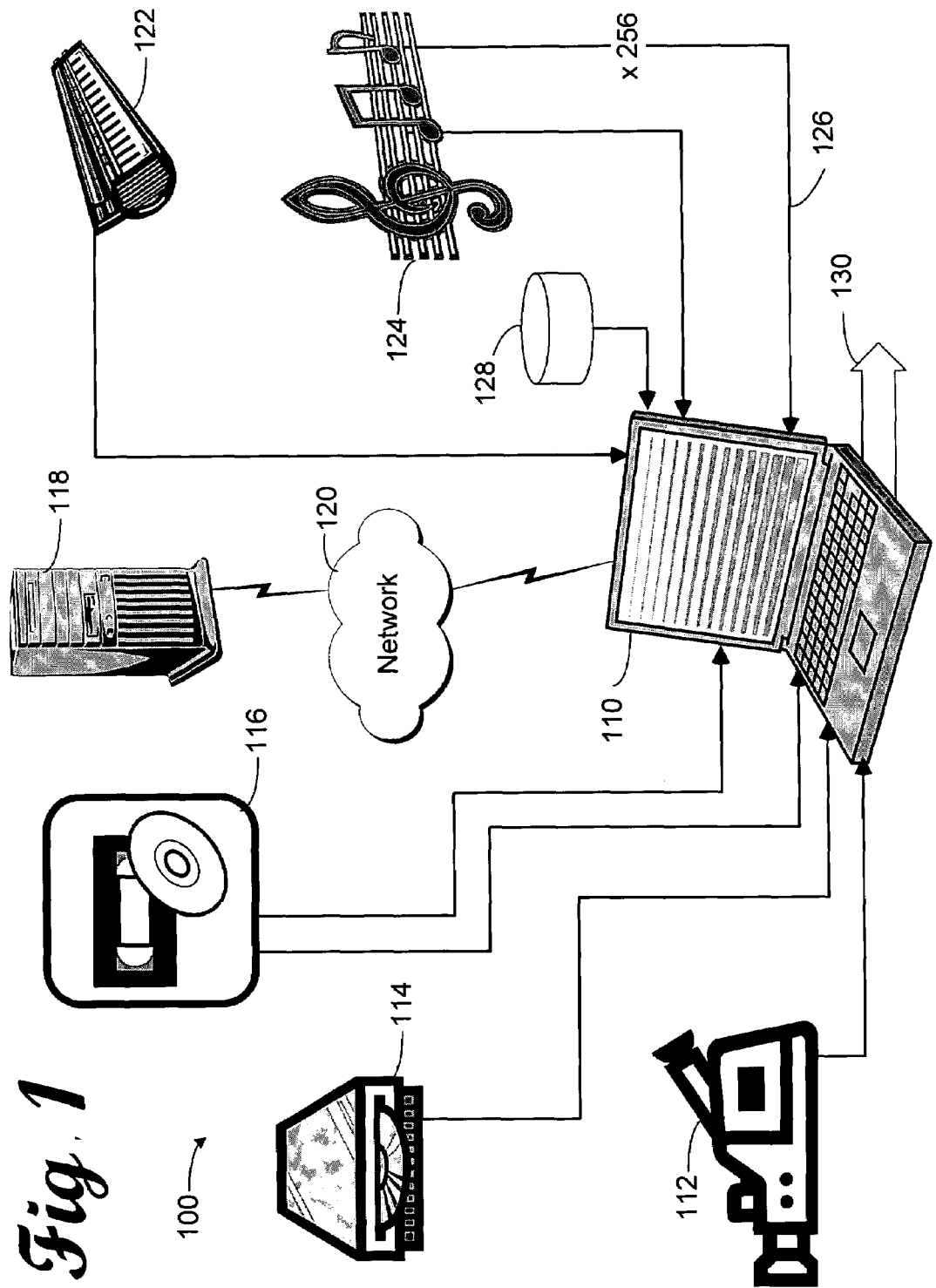
FIG. 1 is a schematic illustration of a multi-signal environment within which an implementation described herein may operate.

FIG. 1 illustrates a typical multi-signal environment 100, where a computing device 110 receives input from multiple sources—each source has one or more signals that potentially includes watermarked intangible goods. A multi-signal environment can result from one source that is capable of generating multiple input signals. An input signal includes signals that may be unmodified or modified within the system receiving them.

Examples of sources that may send one or more input signals include the following illustrated in FIG. 1:

a video camera 112;

a CD or DVD player 114;

other video source 116 (e.g., tape, hard drive, video streaming, etc.);

another computer system 118 located on a network 120 (such as the Internet);

a midi keyboard or device 122;

digital or analog audio input 124 from any of many different sources and formats (e.g., mp3 files, audio channels from video games, etc.);

removable or non-removable data storage devices 128 (e.g., floppy disks, hard drive, flash memory, USB devices, etc.)

Many of the devices can produce multiple input channels. For example, line 126 is labeled "x 256" to indicate that it may actually be 256 different input audio channels.

To protect the incoming intangible goods (e.g., licensed music or video), watermark detection must be performed on each incoming signal. In the case of hundreds of input channels, that means dynamic watermark detection must be performed on each of the hundreds of channels while the signals are being received.

Traditionally, each separate possible input has its own watermark detector. Often this was accomplished by using a separate watermark detector program module (typically software, but may be hardware as well) for each separate input. This conventional approach requires a separate module for each input port.

For example, the CD player 114 may have its own watermark detection program module loaded into memory by the operating system of the computing device 110. Also, the multimedia player (for playing streaming video from the Internet) may have its own separate watermark detection program module. And so forth for each possible separate input.

As illustrated by line 126 of FIG. 1, some conventional video games may have as many as 256 channels of audio input. The conventional approach requires 256 separate instances of the watermark detector running on the computing device 110. Each one tests the signal from an assigned input channel.

Although they are illustrated as separate hardware devices, input signals may be generated by software program modules (e.g., a threads) running on the computing device 110.

Thus, the conventional approach to watermark detection in a multi-signal environment is inefficient because watermark detection is performed separately for each input. Thus, there is much duplication of effort. In an alternative conventional approach there are detectors on only some of the inputs. In that instance, a pirate may defeat the conventional approach by rerouting input around its dedicated detector.

The computing device 110 may also have one or more output paths 130. These output paths may be used, for example, to communicate with a network device, burning a Redbook CD, playing the S/PDIF port to an external digital receiver (recorder), etc.

Production and Distribution System Employing Embedded-Signals

FIG. 2 shows an example of a content production and distribution system 220 having a content producer/provider 222 that produces original content (e.g., original audio and/or video) and distributes the content over a network 224 to the computing device 226 or via computer-readable media 225, such as a CD-ROM.

The content producer/provider 222 has a content storage 230 to store intangible goods (e.g., multimedia streams) of original content. The content producer 222 has a watermark encoding system 232 to embed the intangible goods with a watermark. That watermark may uniquely identify the content with the content producer/provider 222. The watermark encoding system 232 may be implemented as a standalone process or incorporated into other applications or an operating system.

The watermark encoding system 232 applies the watermark to intangible goods from the content storage 230. The watermark may, for example, identify the content producer 222 by providing a signature that is embedded in the signal.

The content producer/provider 222 has a distribution server 234 that streams the watermarked intangible goods over the network 224 (e.g., the Internet). Alternatively, it stores the watermarked intangible goods onto computer-readable media 225 (e.g., floppy disk or CD-ROM).

The computing device 226 is equipped with a processor 240, a memory 242, one or more input devices 246, and one or more output devices 244 (e.g., speakers, monitor, digital media writer, etc.). The one or more input devices is designed to receive signals containing intangible goods from one or more sources, such as sources illustrated in FIG. 1.

The memory 242 stores an operating system 250 (such as a Microsoft® Windows XP® operating system), which executes on the processor. The computing device 226 may be embodied in a many different ways, including a computer, a handheld entertainment device, a set-top box, a television, an audio appliance, and so forth.

Typically, multiple program modules are running under the operating system 250. One module may be a central watermark detector (CWD) 252 which is an implementation of the exemplary CWD described herein. With the CWD, this computing device 226 only needs one watermark detector for its multiple inputs coming through the one or more input devices 246.

Typically, the CWD 252 is a software module and it is typically incorporated into the operating system. Alternatively, the CWD 252 may be implemented in hardware which is called by the operating system 250.

Another module may be a intangible goods consumer 254, which is designed to receive and consume the incoming intangible goods. Of course, the consumer 254 does not need to be a part of the operating system. The consumer 254 may be, for example, in the case of multimedia, a multimedia player to facilitate play of multimedia content through the output device(s) 244 (e.g., sound card, speakers, storage unit, etc.). It may be, for example, a third-party driver for a external device. If the watermark is present, the computing device can detect its presence and identify its associated information.

Alternatively, block 254 could be a digital transceiver that conveys an omnibus mixed signal to a receiver external to the client computer.

The operating system 250 and/or processor 240 may be configured to enforce certain rules imposed by the content producer/provider (or copyright owner). For instance, the operating system and/or processor may be configured to reject fake or copied content that does not possess a valid watermark. In another example, the system could play unverified content with a reduced level of fidelity. In still another example, unverified content is played through analog outputs only.

The CWD 252 is a dynamic detector. Typically, when a dynamic detector does not detect an embedded-signal, then it assumes that there is no embedded-signal (e.g., watermark) in the subject intangible goods (e.g., carrier signal).

With a dynamic detector, the signal is being consumed (e.g., played, stored, presented, etc.) while detection is being performed. If a watermark is detected, the enforcement modules on the computing device 226 may impair (e.g., halt or mute) the consumption of the incoming signal.

Exemplary Central Watermark Detector (CWD)

Figure 3:
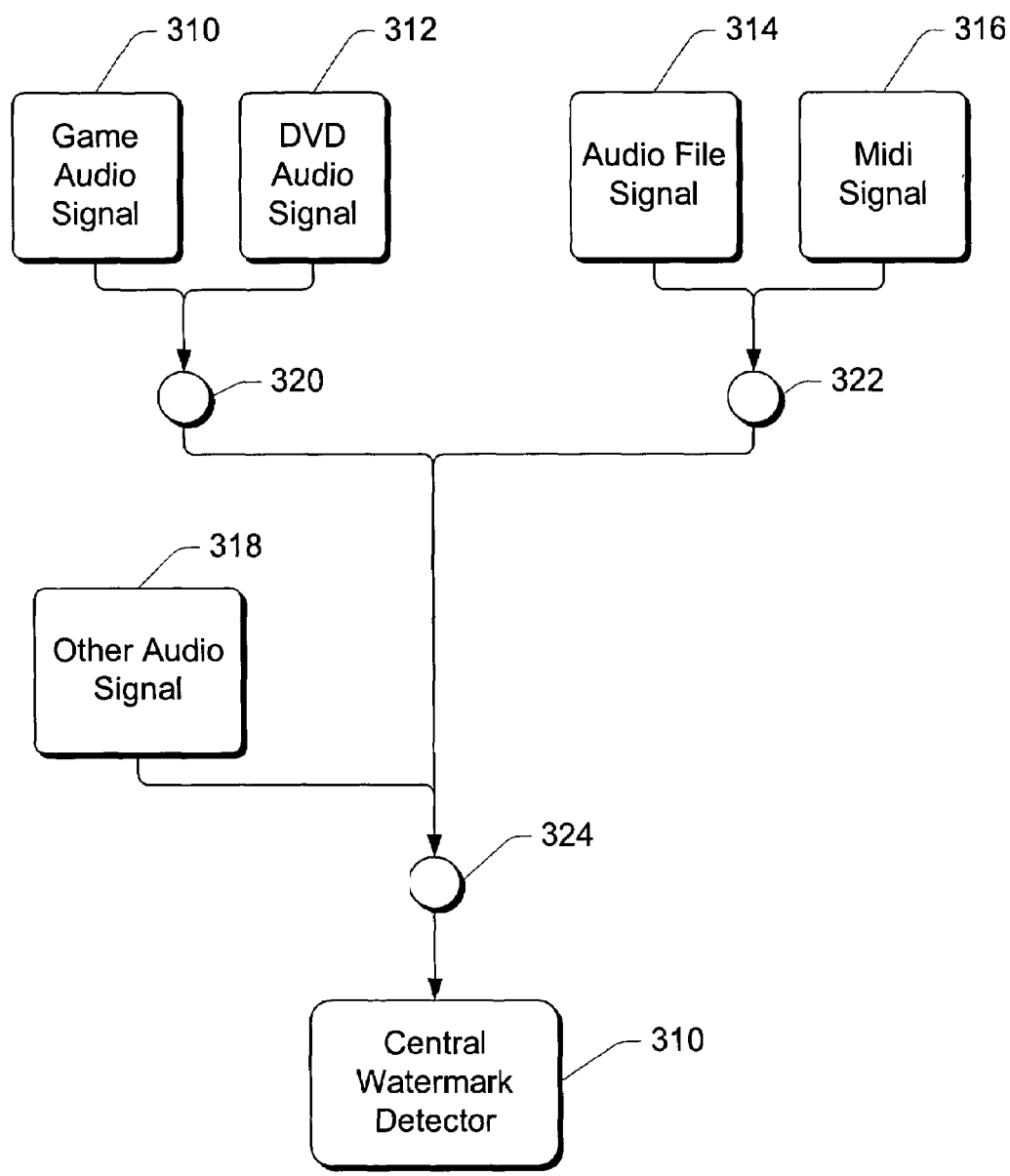
FIG. 3 is a block diagram illustrating an example of the operation of an implementation described herein.

As illustrated in FIG. 3, the exemplary CWD logically views the input signal pipeline as a tree, with multiple sources flowing downward from the top, mixing as they flow to the bottom, where a single omnibus signal stream exists. Generally speaking, an omnibus signal stream contains two or more incoming signals mixed together. The exemplary CWD runs on the root of this tree.

FIG. 3 illustrates an exemplary multi-signal situation of the operation of the exemplary CWD. All of the incoming signals are mixed together. As shown in FIG. 3 at 320, game audio signal 310 and DVD audio signal 312 are mixed together. Similarly, audio file signal 314 (e.g., a MP3-formatted file) and a midi synthesis signal 316 are mixed together at 322. At 324, this mixed signal is added to another audio signal 318, such as WMA file being played over a network.

Alternatively, FIG. 3 may be viewed as multiple video signals being mixed together. In that view, a game video signal and DVD main video signal are mixed together at 320 of FIG. 3. At 322, video subtitle signal and DVD menu signal are mixed together. At 324, this mixed signal is added to one or more other signals, such as closed caption data signal and any Picture-In-Picture video signals.

Each of these mixer points 320, 322, and 324 represents a "branch" in this tree-like structure.

As shown in FIG. 3, a CWD 310 receives the omnibus mixed signal as output from mixer 324. The CWD performs watermark detection on the omnibus mixed signal. Thus, all of the incoming signals are mixed together before testing by the CWD 310.

If no watermark is detected in the omnibus mixed signal, then that means that none of the original unmixed input signals (e.g., 310-318) have a watermark embedded therein. If it does indeed detects a watermark, then that means that at least one of the original unmixed input signals (e.g., 310-318) includes a watermark.

Of course, this assumes that mixing the signals does not destroy the watermarks embedded therein. Watermarks are typically designed to remain intact after purposeful attacks by pirates. Therefore, it is reasonable to assume that these watermarks are sufficiently robust to withstand mixing.

Amongst the multiple input signals, there may be multiple watermarked streams being played concurrently. So, the detector may be actively tracking more than one watermark at any time. Consequently, it may be in different parts of the mixing tree concurrently.

Searching for the Watermarked Signal

If the CWD 310 detects a watermark, it knows that at least one of the incoming signals has a watermark. As shown in FIG. 3, the mixing of the incoming signals may be viewed as a "tree." As such, the CWD 310 may perform a breadth- or depth-search of the tree to locate the one incoming signal with the watermark. Those of ordinary skill in the art are familiar with such tree search approaches.

The CWD 310 performs a "tree search" to find the "branch" (of mixed inputs) that has the mark in it. In doing the tree search, the CWD 310 ultimately reaches the "leaf" (or single input) that has the watermark therein.

Once it locates the signal with the embedded signal, it notifies the operating system or an "enforcer." Alternatively, the CWD 310 may be empowered to take action. Such action may include user-notification (e.g., audio and/or textual dialog box), transmission of a notification signal (to copyright clearinghouse, perhaps), and/or signal impairment. Other possible actions include impairing the master signal immediately while finding the correct "leaf" signal. As certain signals (or submixes) are ruled out, those may be re-enabled. Impairment may include, for example, muting an audio signal or severely degrading a multimedia signal.

Other Implementation Notes

It may take several seconds (10-15) upon initial reception to detect an incoming watermark. But since the exemplary CWD is processing the mixed signals (rather than each one separately and concurrently), it may process them all very quickly. Therefore, the CWD 310 is configured to determine whether an incoming signal includes a watermark or not within 30 seconds of the signal consumption begins.

The specific watermark detection engine utilized by the (CWD) is an implementation design choice. In fact, the exemplary CWD may utilize multiple different watermark detection engines to concurrently detect a watermark using the multiple ways in which a watermark may be embedded into a signal.

Watermark Circumvention Countermeasures

To avoid a "starvation" type watermark circumvention attack, the CWD may run at a higher priority than the media (e.g., audio or video) mixing. Then the CWD will never effectively get starved since before the system gets to that point, the media signal would stutter and stop playing. Effectively, the CWD would be a higher priority than the resultant media that is actually playing.

To avoid an "input-location and -interference" type watermark circumvention attack, the CWD may move around in memory periodically. This will make it difficult to get a fix on the signal's input location.

To avoid a "circumvention by decoy" type attack, there may be multiple concurrent CWDs running in different parts of the tree (and always one at the root).

Methodological Implementation of the Exemplary CWD

Figure 4:
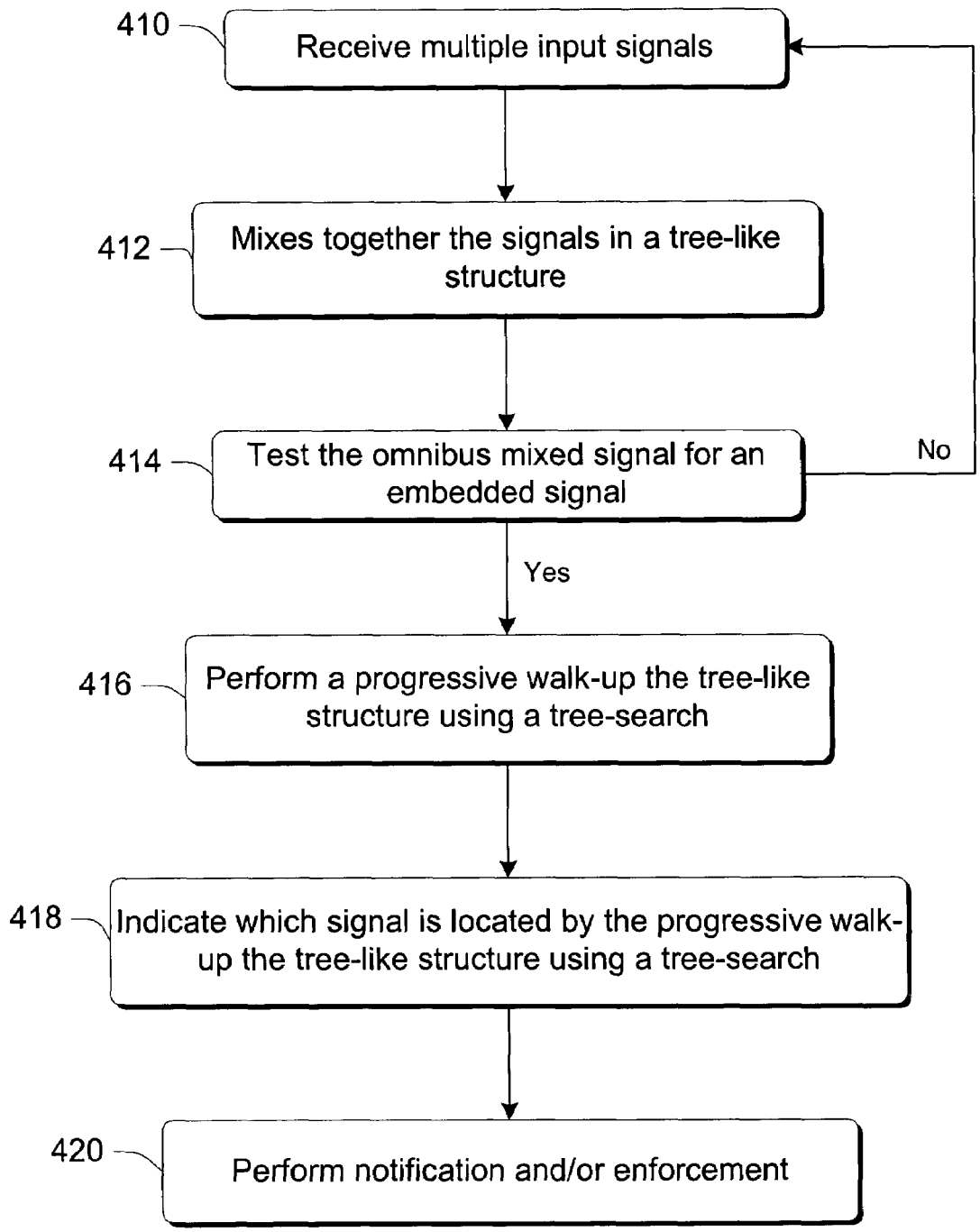
FIG. 4 is a flow diagram showing a methodological implementation described herein.

FIG. 4 shows a methodological implementation of the exemplary CWD (CWD) performed by the central watermark detector 252 (or some portion thereof). This methodological implementation may be performed in software, hardware, or a combination thereof.

At 410 of FIG. 4, the exemplary CWD receives multiple input signals—each containing intangible goods that potentially includes an embedded-signal (e.g., a watermark).

At 412, the exemplary CWD mixes together the signals in a tree-like structure. As shown in FIG. 3, this tree-like structure is configured so that small groups (e.g., 2-4) of signals are initially mixed and then those "branches" are progressively mixed into small groups (e.g., 2-4) of branches until all of the signals are mixed together into an omnibus mixed signal.

At 414, it performs detection on the omnibus mixed signal for an embedded signal. If a watermark is not detected, then the process ends for now. Since the inputs are dynamically changing and a watermark may be inserted anywhere within a signal, this process is likely to effectively be endlessly repeated as long as there are input signals. If a watermark is actually detected, then the process moves to block 416.

Alternatively (or in addition to) moving to 416, the exemplary CWD may impair the omnibus signal. As it eliminates "leafs" as potential suspects, it releases them from impairment. Therefore, it eventually narrows the number of streams under enforcement down to only the individual watermarked stream over time as the process locates the targeted signal.

At 416, the exemplary CWD performs a progressive walk-up the tree-like structure using a tree-search (e.g., breadth- or depth-search). Consequently, it progressively "walks" its way through the tree-like structure in which the signals are mixed. At each branch, it tests for a watermark. If it does not find one, it moves on to another branch. If it finds one, then it moves up into that branch. It continues that until it locates at least one signal with a watermark detected therein. It may continue to test other branches to see if there is more than one signal containing a watermark.

At 418, it indicates which signal(s) are located by the progressive walk-up the tree-like structure using a tree-search. This indication may be to the operating system or a specially designated enforcer program module.

At 420, the exemplary CWD may perform notification and/or enforcement. Notification may include user-notification (e.g., audio and/or textual dialog box) or transmission of a notification signal (to copyright clearinghouse, perhaps). Enforcement may include signal impairment, such as muting an audio signal or severely degrading a multimedia signal.

Exemplary Computing System and Environment

FIG. 5 illustrates an example of a suitable computing environment 500 within which an exemplary CWD, as described herein, may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The exemplary CWD may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary CWD may be described in the general context of computer-executable instructions, such as program modules, being executed by a computer. Generally, program modules include routines, programs, objects, components, data structures, etc. that performs particular tasks or implement particular abstract data types. The exemplary CWD may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing device in the, form of a computer 502. The components of computer 502 may include, by are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, 3GIO (from INTEL™), NuBus (from Apple™) and a Peripheral Component Interconnects (PCI) bus also known as a Mezzanine bus.

Computer 502 typically includes a variety of computer readable media. Such media may be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 may be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 516, magnetic disk 520, optical disk 524, ROM 512, and/or RAM 510, including by way of example, an operating system 526, one or more application programs 528, other program modules 530, and program data 532.

A user may enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB). An example of an input/output interfaces 540 is an audio system.

A monitor 542 or other type of display device may also be connected to the system bus 508 via an interface, such as a video adapter 544. In addition to the monitor 542, other output peripheral devices may include components such as speakers (not shown) and a printer 546 which may be connected to computer 502 via the input/output interfaces 540.

Computer 502 may operate in a networked environment using logical connections to one or more remote computers, such as a remote computing device 548. By way of example, the remote computing device 548 may be a personal computer, portable computer, a server, a router, a network computer, a peer device or other common network node, and the like. The remote computing device 548 is illustrated as a portable computer that may include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which may be internal or external to computer 502, may be connected to the system bus 508 via the input/output interfaces 540 or other appropriate mechanisms. It is to be appreciated that the illustrated network connections are exemplary and that other means of establishing communication link(s) between the computers 502 and 548 may be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Computer-Executable Instructions

An implementation of an exemplary CWD may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 500 in which an exemplary CWD may be implemented. Specifically, the exemplary CWD(s) described herein may be implemented (wholly or in part) by any program modules 528-530 and/or operating system 526 in FIG. 5 or a portion thereof.

The operating environment is only an example of a suitable operating environment and is not intended to suggest any limitation as to the scope or use of functionality of the exemplary CWD(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary CWD may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable storage medium having a program module with computer-executable instructions that, when executed by a computer, performs a method comprising:
    obtaining an omnibus signal comprising multiple input signals received from multiple different sources and mixed together, wherein when the omnibus signal is obtained it is unknown whether at least one of the input signals includes an embedded signal therein;
    testing the omnibus signal comprising the multiple input signals with a detector which views the multiple input signals of the omnibus signal as a single continuous stream which is to be examined for the presence of an embedded signal, and determining that one of the multiple input signals of the omnibus signal includes an embedded signal therein; and
    performing a tree-search of a tree-like organizational structure which represents the multiple input signals of the omnibus signal to locate which of the multiple input signals has the embedded signal therein.

2. A computer-readable storage medium as recited in claim 1, wherein the method further comprises locating one of the multiple input signals that has an embedded signal therein.

3. A computer-readable storage medium as recited in claim 1, wherein the multiple signals are passed through and consumed by one or more computer-executable program modules, the method further comprises locating one of the multiple input signals that has an embedded signal therein, the locating occurring within about thirty seconds or less of consumption of the located signal.

4. A computer-readable storage medium as recited in claim 1, wherein the method further comprises:
    locating one of the multiple input signals that has an embedded signal therein;
    indicating the located signal.

5. A computer-readable storage medium as recited in claim 1, wherein the method further comprises:
    locating one of the multiple input signals that has an embedded signal therein;
    generating a notification based upon the locating.

6. A computer-readable storage medium as recited in claim 1, wherein the method further comprises:
    locating one of the multiple input signals that has an embedded signal therein;
    impairing the located signal.

7. A computer-readable storage medium as recited in claim 1, wherein the method further comprises:
    locating one of the multiple input signals that has an embedded signal therein;
    muting the located signal when that signal is an audio signal.

8. A computer-readable storage medium as recited in claim 1, wherein the method further comprises:
    locating one of the multiple input signals that has an embedded signal therein;
    impairing one or more of the multiple input signals during the locating;
    when the one of the multiple input signals with an embedded signal therein is located by the locating, impairing only the located signal.

9. A computer-readable storage medium as recited in claim 1, wherein each of the multiple input signals of the omnibus signal may potentially have an embedded signal therein, the multiple signals being mixed together into the omnibus signal and in a tree-like organizational structure with each of the multiple input signals is a "leaf" in the tree-like organizational structure and each "leaf" represents one of the multiple input signals that is unmixed with other signals.

10. A computer-readable storage medium as recited in claim 1, wherein performing the tree search further comprises "walking" up the tree-like organizational structure and testing the signal at each "branch" or "leaf" encountered in the walk up the tree-like organizational structure to determine if the signal at that branch or leaf includes an embedded signal therein.

11. A computer-readable storage medium as recited in claim 1, wherein the one or more the multiple input signals is selected from a group consisting of image, audio, video, multimedia, software, metadata, and data.

12. A computer-readable storage medium as recited in claim 1, further comprising operating system computer executable instruction.

13. A computing device comprising:
    an input device for receiving one or more input signals; and
    a program module with computer-executable instructions that, when executed by a computer, performs a method comprising:
    obtaining an omnibus signal comprising multiple input signals received from multiple different sources and mixed together, wherein when the omnibus signal is obtained it is unknown whether at least one of the input signals includes an embedded signal therein;
    testing the omnibus signal comprising the multiple input signals with a detector which views the multiple input signals of the omnibus signal as a single continuous stream which is to be examined for the presence of an embedded signal, and determining that one of the multiple input signals of the omnibus signal includes an embedded signal therein; and
    performing a tree-search of a tree-like organizational structure which represents the multiple input signals of the omnibus signal to locate which of the multiple input signals has the embedded signal therein.

14. A method for dynamic detecting of robust embedded-signals in a multiple-signal environment, the method comprising:

obtaining an omnibus signal comprising multiple input signals received from multiple different sources and mixed together, wherein when the omnibus signal is obtained it is unknown whether at least one of the input signals includes an embedded signal therein;

testing the omnibus signal comprising the multiple input steams with a detector which views the multiple input streams of the omnibus signal as a single continuous stream which is to be examined for the presence of an embedded signal, to determine if at least one of the multiple input steams of the omnibus signal includes an embedded signal therein, wherein each of the multiple input signals of the omnibus signal may potentially have an embedded signal therein, the multiple signals being mixed together into the omnibus signal and in a tree-like organizational structure with each of the multiple input signals is a "leaf" in the tree-like organizational structure and each "leaf" represents one of the multiple input signals that is unmixed with other signals.

15. A method as recited in claim 14 further comprises locating one of the multiple input signals that has an embedded signal therein.

16. A method as recited in claim 14, wherein the multiple signals are passed through and consumed, the method further comprising locating one of the multiple input signals that has an embedded signal therein, the locating occurring within about thirty seconds or less of consumption of the located signal.

17. A method as recited in claim 14 further comprising:
locating one of the multiple input signals that has an embedded signal therein;
indicating the located signal.

18. A method as recited in claim 14 further comprising:
locating one of the multiple input signals that has an embedded signal therein;
generating a notification based upon the locating.

19. A method as recited in claim 14 further comprising:
locating one of the multiple input signals that has an embedded signal therein;
impairing the located signal.

20. A method as recited in claim 14 further comprising:
locating one of the multiple input signals that has an embedded signal therein;
muting the located signal when that signal is an audio signal.

21. A method as recited in claim 14 further comprising:
locating one of the multiple input signals that has an embedded signal therein;
impairing one or more of the multiple input signals during the locating;
when the one of the multiple input signals with an embedded signal therein is located by the locating, impairing only the located signal.

22. A method as recited in claim 14, if the testing finds an embedded signal in the omnibus signal, then further comprising performing a tree-search of the tree-like organizational structure to locate which one of the multiple input signals has an embedded signal therein.

23. A method as recited in claim 14, if the testing finds an embedded signal in the omnibus signal, then the method further comprises progressively "walking" up the tree-like organizational structure and testing the signal at each "branch" or "leaf" encountered in the walk up the tree-like organizational structure to determine if the signal at that branch or leaf includes an embedded signal therein.

24. A method as recited in claim 14, wherein the type of the one or more the multiple input signals is selected from a group consisting of image, audio, video, multimedia, software, metadata, and data.

25. A computer comprising one or more computer-readable media having computer-executable instructions that, when executed by the computer, perform the method as recited in claim 14.

26. An embedded-signal detection system comprising:
a memory;
a processor; and
a single embedded-signal detector configured to perform a method, the method comprising:
receive an omnibus mixed signal which comprises multiple input signals that have been received from multiple different sources and mixed together in a tree-like organizational structure with each of the multiple input signals being a "leaf" in the tree-like organizational structure and each "leaf" representing one of the multiple input signals that is unmixed with other signals, wherein when the omnibus signal is received by the detector it is unknown whether at least one of the input signals comprises an embedded signal therein;
concurrently test the multiple input signals of the omnibus signal as a single continuous stream which is examined for the presence of an embedded signal to determine if at least one of the multiple input signals of the omnibus mixed signal comprises an embedded signal therein; and
perform a tree-search of the tree-like organizational structure which represents the multiple input signals of the omnibus signal to locate which of the multiple input signals has the embedded signal therein.

27. A system as recited in claim 26, wherein the detector being further configured to locate one of the multiple input signals that has an embedded signal therein.

28. A system as recited in claim 26, wherein the multiple signals are passed through to a signal consumer, the detector being further configured to locate one of the multiple input signals that has an embedded signal therein, the locating occurring within about thirty seconds or less of consumption of the located signal.

29. A system as recited in claim 26, wherein the detector being further configured to locate one of the multiple input signals that has an embedded signal therein and indicate the located signal.

30. A system as recited in claim 26, wherein the detector being further configured to locate one of the multiple input signals that has an embedded signal therein and generate a notification based upon the locating.

31. A system as recited in claim 26, wherein the detector being further configured to locate one of the multiple input signals that has an embedded signal therein and impair the located signal.

32. A system as recited in claim 26, wherein the detector being further configured to locate one of the multiple input signals that has an embedded signal therein, impair one or more of the multiple input signals while it locates the one signal with an embedded signal therein, and when the one of the multiple input signals with an embedded signal therein is located, impair only the located signal.

33. A system as recited in claim 26, wherein the detector is further configured to perform a tree-search of the tree-like organizational structure, if the detector finds an embedded signal in the omnibus signal, to locate which one of the multiple input signals has an embedded signal therein.

34. A system as recited in claim 26, wherein the detector is further configured to progressively "walk" up the tree-like organizational structure if the detector finds an embedded signal in the omnibus signal and is further configured to test the signal at each "branch" or "leaf" encountered in the walk up the tree-like organizational structure to determine if the signal at that branch or leaf includes an embedded signal therein.

35. A system as recited in claim 26, wherein the type of the one or more the multiple input signals is selected from a group consisting of image, audio, video, multimedia, software, metadata, and data.

* * * * *